United States Patent
Ma et al.

(10) Patent No.: US 10,014,735 B2
(45) Date of Patent: Jul. 3, 2018

(54) PERMANENT-MAGNETIC DIRECT-DRIVE WIND GENERATOR, SYSTEM AND STATOR THEREOF

(71) Applicant: XINJIANG GOLDWIND SCIENCE & TECHNOLOGY CO., LTD., Urumqi (CN)

(72) Inventors: Shengjun Ma, Urumqi (CN); Rujang Xin, Urumqi (CN); Dong Wang, Urumqi (CN); Chengqian Liu, Urumqi (CN)

(73) Assignee: XINJIANG GOLDWIND SCIENCE & TECHNOLOGY CO., LTD, Urumqi, Xinjiang (CN)

( * ) Notice: Subject to any disclaimer, the term of this patent is extended or adjusted under 35 U.S.C. 154(b) by 0 days.

(21) Appl. No.: 15/554,133

(22) PCT Filed: Nov. 17, 2015

(86) PCT No.: PCT/CN2015/094852
§ 371 (c)(1),
(2) Date: Aug. 28, 2017

(87) PCT Pub. No.: WO2016/165323
PCT Pub. Date: Oct. 20, 2016

(65) Prior Publication Data
US 2018/0069442 A1 Mar. 8, 2018

(30) Foreign Application Priority Data
Apr. 15, 2015 (CN) .......................... 2015 1 0178525

(51) Int. Cl.
*H02K 1/18* (2006.01)
*H02K 1/20* (2006.01)
(Continued)

(52) U.S. Cl.
CPC ................. *H02K 1/18* (2013.01); *F03D 9/25* (2016.05); *H02K 1/20* (2013.01); *H02K 5/10* (2013.01); *H02K 9/04* (2013.01)

(58) Field of Classification Search
CPC .. H02K 1/18; H02K 1/20; H02K 5/10; H02K 9/04; F03D 9/25
(Continued)

(56) References Cited

U.S. PATENT DOCUMENTS

2006/0152014 A1 7/2006 Grant et al.
2014/0346781 A1 11/2014 Airoldi et al.

FOREIGN PATENT DOCUMENTS

CN 103184982 A 7/2013
CN 103291452 A 9/2013
(Continued)

OTHER PUBLICATIONS

Notification of the First Office Action issued by the State Intellectual Property Office of People's Republic of China for Chinese Patent Application No. 201510178525.9, dated Nov. 18, 2016.
(Continued)

*Primary Examiner* — Alex W Mok
(74) *Attorney, Agent, or Firm* — Finnegan, Henderson, Farabow, Garrett & Dunner, LLP

(57) ABSTRACT

A stator of a permanent magnet direct-drive wind power generator includes a stator support, a stator iron core, a blade side tooth pressing plate and a blade side surrounding plate. At least one comb tooth air inlet hole is provided on a side close to the rotor of the blade side surrounding plate, the comb tooth air inlet hole and the second air hole are connected respectively via an air guide pipe. A first spiral comb tooth mechanism is provided on a side, close to the rotor sealing ring, of the blade side surrounding plate, the first spiral comb tooth mechanism is in communication with
(Continued)

the comb tooth air inlet hole. The first spiral comb tooth mechanism has first spiral comb teeth protruding into an annular gap formed by the blade side surrounding plate and the rotor sealing ring for generating an airflow with spiral motion.

20 Claims, 7 Drawing Sheets

(51) Int. Cl.
*H02K 9/04* (2006.01)
*H02K 5/10* (2006.01)
*F03D 9/25* (2016.01)

(58) Field of Classification Search
USPC .......................................................... 310/56
See application file for complete search history.

(56) References Cited

FOREIGN PATENT DOCUMENTS

| | | |
|---|---|---|
| CN | 103490558 A | 1/2014 |
| CN | 203522438 U | 4/2014 |
| CN | 104179641 A | 12/2014 |
| CN | 104234947 A | 12/2014 |
| CN | 104810942 A | 7/2015 |
| CN | 204497868 U | 7/2015 |
| EP | 1586769 A2 | 10/2005 |
| EP | 1586769 B1 | 12/2014 |
| JP | 2010213543 A * | 9/2010 |
| WO | WO 0121956 A1 * | 3/2001 ............... H02K 5/12 |

OTHER PUBLICATIONS

International Search Report issued by the State Intellectual Property Office of People's Republic of China for International Application No. PCT/CN2015/094852, dated Jan. 13, 2016.

* cited by examiner

PERMANENT-MAGNETIC DIRECT-DRIVE WIND GENERATOR, SYSTEM AND STATOR THEREOF

This application is a U.S. National Phase entry under 35 U.S.C. § 371 from PCT International Application No. PCT/CN2015/094852, filed Nov. 17, 2015, which claims benefit of priority of Chinese Patent Application No. 201510178525.9, filed Apr. 15, 2015, both of which are incorporated herein by reference.

FIELD

This application relates to the field of wind power technology, and particularly to a permanent magnet direct-drive wind power generator, a permanent magnet direct-drive wind power generator system and a stator thereof.

BACKGROUND

An open-type permanent magnet direct-drive outer-rotor wind power generator in the conventional technology is cooled by natural air. An open-type structure is conducive to natural ventilation heat transfer, and facilitates the use of a permanent magnet material for magnetic poles to prevent magnetism reduction in case of an impermissible degree of temperature rising. However, the power generator is usually exposed to extremely severe environmental conditions (exposed to wind, frost, rain, snow, dust, salt fog, etc.).

Air-cooled generator insulation having a tendency to being moistened is decided by its operation status and structure. Since the generator insulation can only employ a solid insulation medium which is embedded in iron core slots, and cannot be immersed in an insulating oil like a transformer does, and also cannot be sealed in an airtight metal shell filled with SF6 gas like a full-closed gas insulated substation (GIS) does, but can only be exposed to the air. During normal operation, heat generated by an iron core and a winding of the generator needs to be brought away by flowing air. When heat generated by the generator and heat dissipated from the generator reach equilibrium, temperatures of the iron core and the winding of the generator are maintained within a certain numerical range. When the generator operates normally, the interior of the natural air cooled outer-rotor permanent magnet direct-drive generator also takes air from outdoors as a cooling medium. The temperatures of the iron core and the winding may be higher than the temperature of the air as the cooling medium. After the generator stops, the temperatures of the iron core and the winding drop gradually, and due to the effect of thermal expansion and contraction of the air inside the clearances and air gaps, a lot of air enters the generator to reach a pressure balance. In such a case, the insulation absorbs moisture in the air to be moistened, and if it is in a thunderstorm season, the air humidity may be larger after the rain, and the insulation of the generator will be moistened even more seriously. After the insulation of the generator is moistened, the leakage current is scores of times or even hundreds of times of the normal value, and the insulation resistance is a few tenths of the normal value. According to data analysis, if the generator insulation is seriously moistened, it cannot operate if not performed with a drying treatment. Generator insulation being moistened seriously is considered from the perspective of insulation test data. In fact, at the early stage of the insulation being moistened, only the surface of the insulation adsorbs moisture, and the interior of the insulation has not been moistened, the moisture on the surface of the insulation is tiny and is much easier to dry compared with the case of the insulation being immersed by water.

When the air has a large humidity, the reduction of the insulation resistance, resulted from the insulation of the generator being moistened, takes a short time, e.g. one day or even several hours. Thus it is required that the rain is restricted to enter the generator in rainy days or the wet air inside the generator is taken away timely after the rain.

For the open-type nacelle outer-rotor wind power generator, if a contact seal is employed, the interior of the generator cannot be directly cooled by relatively dry air flow for a long time in the dry time when it is not rainy or snowy.

At present, thermal power generation units, hydroelectric power generation units and nuclear power units operating in power grid are usually arranged in a fixed plant. Generally, the plant may not suffer intrusion of rain and snow. Even if the hydroelectric power generation units are flooded, and the cooling medium (water) used by the above generator units is leaked, maintenance of operating condition of the power generation units operating on the ground is far more convenient than that of onshore or offshore wind power generators operating in the wind plant. In the aspect of generator cooling, while convenience and superior performance of air-cooling in the natural environment can be taken advantage, insulation level of the insulation system of the generator should be addressed and put to the test. The permanent magnet direct-drive outer-rotor wind power generator is exposed to wind, sand, rain, snow, sun exposure or freezing environment after downtime all the year round, which is drastically different from the environment where the ground turbo generators, gas turbine generators, hydraulic turbine generators are located, especially some repair works cost too much, and crane use of the high-altitude operation (60 meters to 120 meters) requires a high payment. So the work which is easy to carry out on the ground becomes even impossible for the wind power generators. In another aspect, operation of the wind power generator is also dependent on windy weather. A wind turbine drives the generator rotor to rotate, and only after the generator stator senses the potential, a three-phase short circuit operation can be implemented at an exit of the stator, and the stator is dried by heat generated by the short-circuit current to improve the insulation level. Meanwhile, it also needs to implement pitch alternation based on the magnitude of the current wind speed to indirectly control the rotation speed of the generator, and further control the short circuit current and control the winding to generate heat to dry the moisture, and all of these conditions are dependent on the weather. Moreover, the duration of the wind affects the moisture drying effect, and the direct-drive outer rotor permanent magnet wind power generator has a large mass and requires an extremely large amount of generated heat, and both the time for heat conduction after heat generation and the mass transfer drying time in moisture drying require several hours, thus the duration and intermittence of the wind both affect the moisture drying effect.

The inventors have found in the practical operation that the conventional technology has the following drawbacks.

(1) The permanent magnet direct-drive outer rotor wind power generator employs natural air to cool a stator iron core support and an outer wall of the rotor, and a certain amount of air in the natural environment intrudes into the cavity of the generator via the clearances between the stator and rotor of the wind power generator, and then flows to another end via the air gap in the axial direction to be gathered together, and light air after being gathered is forced out from a rear end sealed portion and is discharged into atmosphere. It is a gas (vapor)-liquid-solid multiphase fluid (including air, water vapor, rain, snow, salt fog, dust, floc, etc.) that flows through the internal clearances of the generator, which can cause deterioration of insulation performance, result in degradation of electrical properties and mechanical properties as well as reduction of residual pressure level and service life of the insulation of the generator, and eventually result in damage of insulation.

(2) The above description is involved in operations of ground power generation units. High-altitude operations with 60 to 120 meters, including the realization of various functions, especially the maintenance work carried out in the nacelle, usually cannot be implemented by human and material resources and even becomes impossible. Sealing, drying measures and maintenance (repair, replacement) of wind power generators are far more difficult than those of thermal power generators and hydroelectric power generators operating on the ground. Some of the good methods used in the ground power generation units are inconvenient to carry out and even difficult to apply to the wind power generation units operating in high altitude.

(3) The above-mentioned method of drying solely by hot air is only surface drying technology, and cannot meet the drying requirement after interlayer of the laminated sheets inside the stator iron core is moistened.

(4) The use of the open-type structure cannot withstand the hazards brought by air carrying rain or snow intruding into the generator in storm weather or snowy weather, and cooling of the generator is at the cost of reduction of the insulation level.

(5) After shutdown, the humid air inside the cavity of the generator and the air gap is condensed to permeate into the generator, which may cause the coated layer on surfaces of the generator stator and the permeate magnetic pole to be moistened, and may impact their service life.

SUMMARY

An object of embodiments of the present application is to provide a permanent magnet direct-drive wind power generator, a permanent magnet direct-drive wind power generator system and a stator thereof to perform a multiphase air flow sealing to an annular gap formed by a blade side surrounding plate and a rotor sealing ring.

To achieve the above object, a stator of a permanent magnet direct-drive wind power generator is provided according to an embodiment of the present application. The stator includes a stator support, a stator iron core arranged on an outer peripheral wall of the stator support, a blade side tooth pressing plate and a blade side surrounding plate. The blade side tooth pressing plate is arranged on an axial end face at a blade side of the stator iron core, and a rotor which matches with the stator has a rotor sealing ring. At least one first air hole is provided in the outer peripheral wall of the stator support, and at least one second air hole is provided in the blade side tooth pressing plate. The stator further includes at least one air flow passage via which the first air hole and the second air hole are in communication with each other, and the at least one air flow passage extends through the interior of the stator iron core. At least one comb tooth air inlet hole is provided on a side, close to the rotor, of the blade side surrounding plate, the comb tooth air inlet hole and the second air hole are connected via an air guide pipe in a corresponding manner. A first spiral comb tooth mechanism is provided on a side, close to the rotor sealing ring, of the blade side surrounding plate, the first spiral comb tooth mechanism as a whole is annular and is in communication with the comb tooth air inlet hole, the first spiral comb tooth mechanism has first spiral comb teeth, which protrude into an annular gap formed by the blade side surrounding plate and the rotor sealing ring, for generating an airflow with spiral motion in the annular gap.

In addition, a permanent magnet direct-drive wind power generator is further provided according to an embodiment of the present application, which includes a rotor and the stator as described above.

In addition, a permanent magnet direct-drive wind power generator system is further provided according to an embodiment of the present application, which includes the wind power generator as described above and an air source system arranged inside a wind power generator unit. The air source system is connected to the first air hole.

In the permanent magnet direct-drive wind power generator, the permanent magnet direct-drive wind power generator system and the stator thereof according to the embodiments of the present application, the air flow inside the stator can be introduced to an axial end face of the stator iron core, and a spiral air flow can be formed in the annular gap defined by the blade side surrounding plate and the rotor sealing ring with the spiral comb tooth mechanism arranged on the blade side surrounding plate, thereby effectively resisting external severe air flow (such as rain or snow, etc.) to make it difficult to enter into the generator, thus can extend a service life of the permanent magnetic pole, prevent decline of insulation level of components inside the generator, reduce the risk of the generator corroded by the severe air flow (such as rain or snow, etc.) and guarantee the reliability of insulation.

Figure 1:
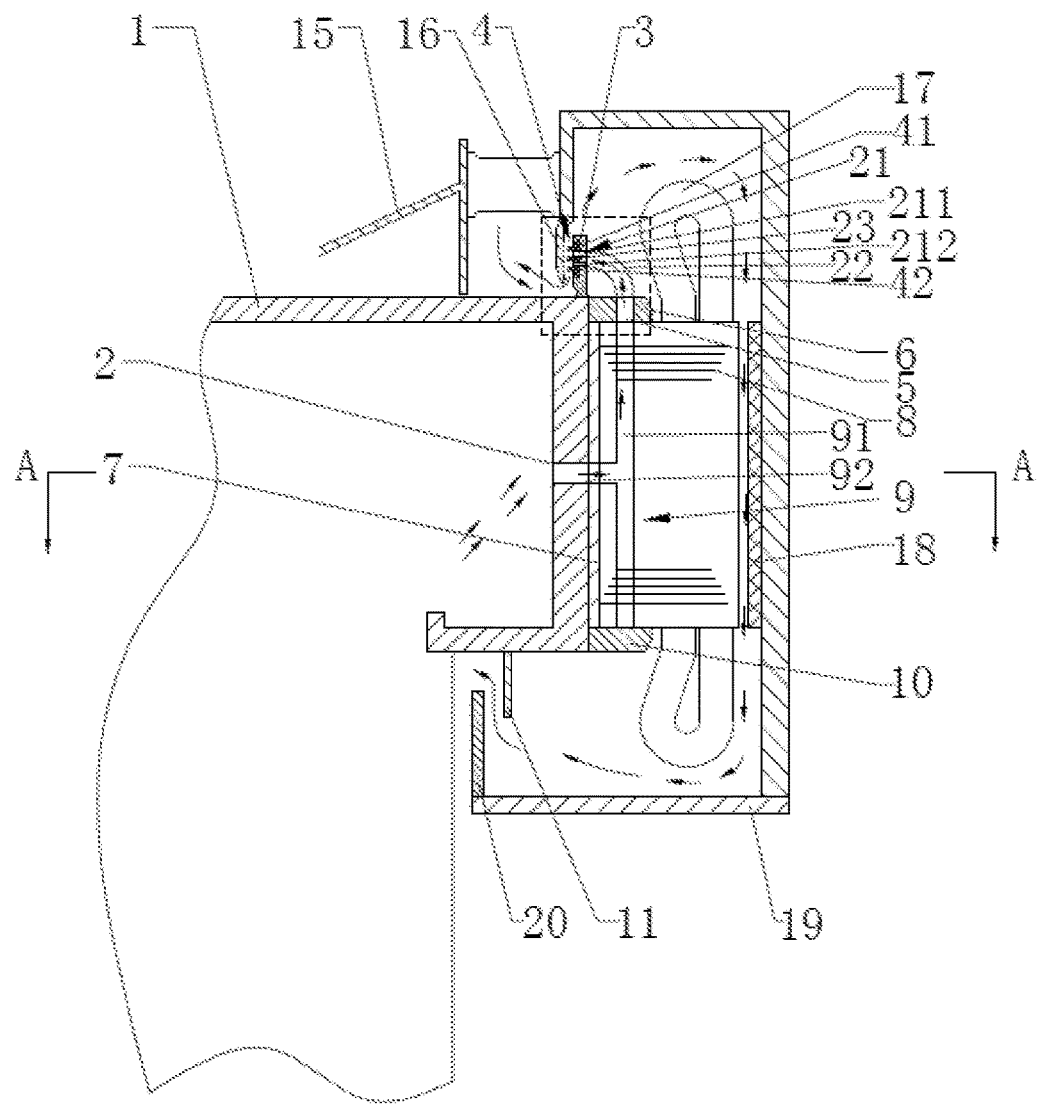
FIG. 1 is a schematic view showing the structure of a stator of a permanent magnet direct-drive wind power generator according to a first embodiment of the present application.

| Explanation to Reference Numerals: | |
|---|---|
| 1 stator support, | 2 first air hole, |
| 3 blade side surrounding plate, | 4 first spiral comb tooth mechanism, |
| 41 first upper spiral comb teeth, | 42 first lower spiral comb teeth, |
| 5 second air hole, | 6 blade side tooth pressing plate, |
| 7 stamped sheet fixing key, | 8 stator iron core, |
| 9 air flow passage, | 91 axial passage, |

-continued

| Explanation to Reference Numerals: | |
|---|---|
| 92 radial passage, | 10 tower side tooth pressing plate, |
| 11 tower side surrounding plate, | 12 air source system, |
| 13 main pipe, | 14 branch pipe, |
| 15 rotor frame, | 16 rotor sealing ring, |
| 17 winding, | 18 magnetic pole, |
| 19 rotor end cover, | 20 end cover sealing ring, |
| 21 comb tooth air inlet hole, | 211 upper air flow outlet, |
| 212 lower air flow outlet, | 22 air guide pipe, |
| 23 first middle comb teeth, | 24 second spiral comb tooth mechanism, and |
| 241 second spiral comb teeth. | |

DETAILED DESCRIPTION

Firstly, the application environment and the technical principle of the embodiments of the present application will be generally described.

In the operation process of the wind power generator, a blade side generally directly faces towards a windward direction, flow coming from the windward direction may bounce off and sputter after hitting a stator support of the wind power generator, and then, the flow may be reflected and accumulated after hitting the rotor sealing ring to cause restorative rising of the air flow pressure (compared with the coming flow), these air flows may intrude into an annular gap between the blade side surrounding plate and the rotor sealing ring.

The embodiments of the present application are proposed in view of the above technical issues. The technical principle of the embodiments of the present application is to utilize air flow passages inside a stator iron core of a permanent magnet direct-drive wind power generator to introduce an internal air source of the generator unit to an axial end face of the stator iron core, and a spiral comb tooth mechanism is arranged at the annular gap formed between the blade side surrounding plate and the rotor sealing ring, so as to use a spiral air flow generated by the spiral comb tooth mechanism to build up a micro-positive pressure environment in an internal space formed after a stator and a rotor of the wind power generator are combined, thereby resisting intrusion of external severe airflow (air, liquid, solid multiphase flow, including air, water vapor, rain, snow, salt spray, dust, floc, etc.). The micro-positive pressure according to the embodiments of the present application refers to that a pressure of the internal air flow generated by the internal air source of the wind power generator system at the annular sealing gap between the stator and the rotor is larger than a pressure of the external coming flow generated at an inlet, and the pressure has a magnitude large enough to prevent the external air flow from entering the interior of the generator. The above-mentioned severe air flow mainly refers to the gas-liquid two-phase flow of rain-water or gas-solid two-phase flow of wind-snow. Of course, in extreme cases, there are also gas-liquid-solid multiphase flow, including, for example, air, water vapor, rain, snow, salt spray, dust, floc etc. These severe air flows are mainly found in harsh weather conditions such as rain or snow. Therefore, the device of the embodiments of the present application are designed to mainly resist these severe air flows, and in the case of normal dry weather, the wind power generator can be dried and cooled by dry air flow entering the wind power generator without adopting the device according to the embodiments of the present application.

Embodiments of the present application are described in detail hereinafter with reference to the drawings.

First Embodiment

As shown in FIG. 1, it is a schematic view showing the structure of a stator of a permanent magnet direct-drive wind power generator according to the first embodiment of the present application. For convenience of description, an upper side in FIG. 1 can be defined as a blade side (during operation of the wind power generator, the blade side generally faces a windward side), and a lower side is defined as a tower side (during operation of the wind power generator, the tower side generally faces a leeward side), a horizontal direction is defined as a radial direction (radially centered on the entire wind power generator), and a vertical direction is defined as an axial direction (a direction along the rotating shaft of the wind power generator). In addition, an outer peripheral wall of a stator support 1 refers to a side wall which is in contact with or adjacent to the stator iron core 8 or a stamped sheet fixing key 7 configured to fix the stator iron core 8, i.e., an outermost portion of the stator support 1.

The stator of the permanent magnet direct-drive wind generator according to this embodiment includes a stator support 1, a stator iron core 8 arranged around an outer peripheral wall of the stator support 1, a blade side tooth pressing plate 6 provided on an axial end face at the blade side of the stator iron core 8, and a blade side surrounding plate 3. A rotor matching with the stator has a rotor sealing ring 16, and the stator support 1 is cylindrical, therefore at least one first air hole 2 may be provided in the outer peripheral wall of the stator support 1, and at least one second air hole 5 may be provided in the blade side tooth pressing plate 6. The stator may also include at least one air flow passage 9 via which the first air hole 2 and the second air hole 5 are in communication with each other, and the air flow passage 9 may pass through the interior of the stator iron core 8.

Figure 2:
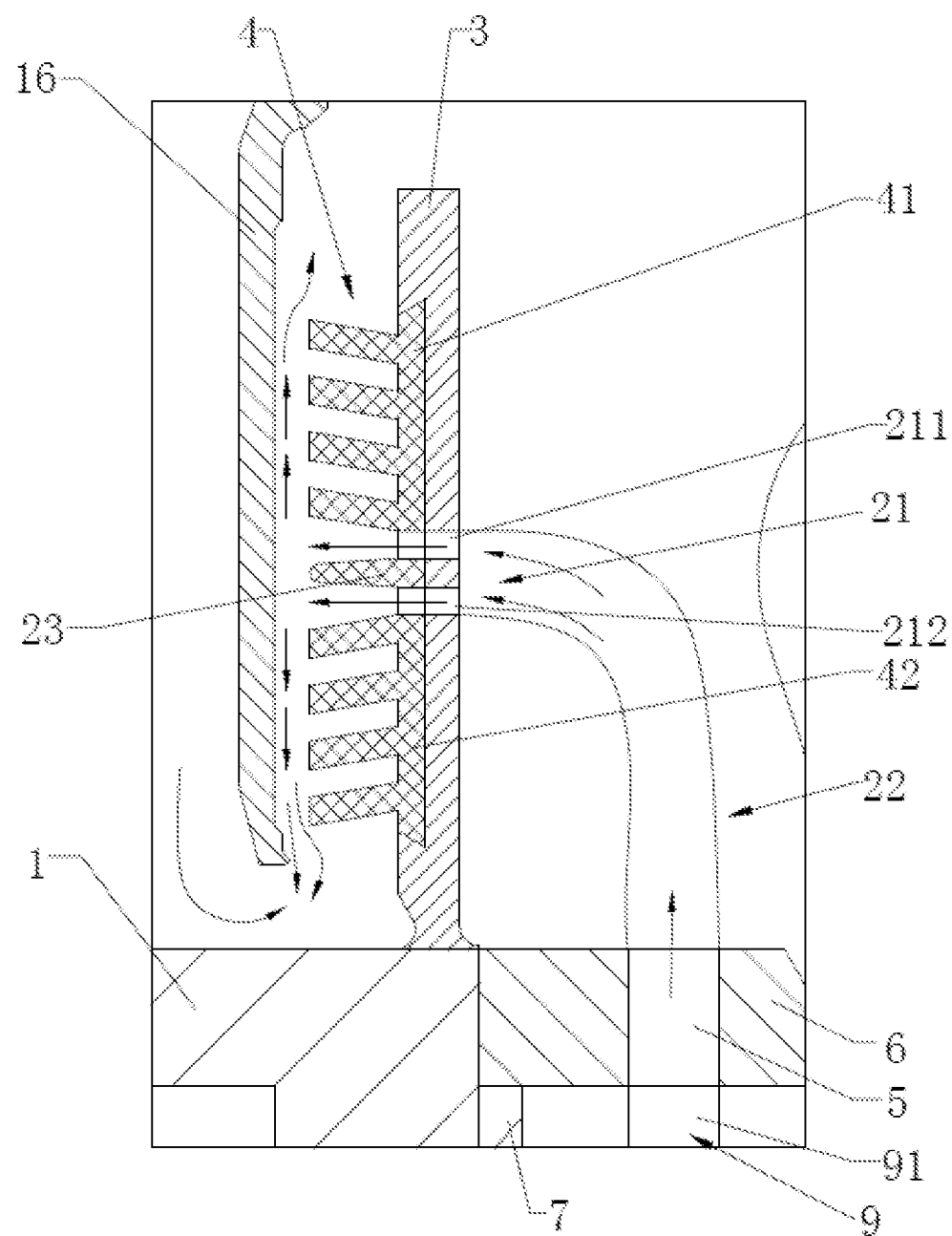
FIG. 2 is a partial schematic structural view of FIG. 1.

At least one comb tooth air inlet hole 21 is provided in the blade side surrounding plate 3 at a side close to the rotor, the comb tooth air inlet hole 21 and the second air hole 5 are connected via an air guide pipe 22. A first spiral comb tooth mechanism 4 is provided on the blade side surrounding plate 3 at a side close to the rotor sealing ring 16. The first spiral comb tooth mechanism 4 as a whole is annular and is in communication with the comb tooth air inlet hole 21. The first spiral comb tooth mechanism has first spiral comb teeth, as shown in FIGS. 1 and 2, and the first spiral comb teeth protrude into the annular gap defined by the blade side surrounding plate 3 and the rotor sealing ring 16, thus generating an airflow with spiral motion in the annular gap.

In the above structure, the air flow generated by the internal air source is introduced to the axial end face of the stator iron core 8 through the first air hole 2, the air flow passage 9 and the second air hole 5. Further, the blade side surrounding plate 3 is also provided with the comb tooth air inlet hole 21, and the comb tooth air inlet hole 21 and the second air hole 5 are connected via the air guide pipe 22 to introduce the air flow from the second air hole 5 into the first spiral comb tooth mechanism 4 provided on the blade side surrounding plate 3, thereby generating a spiral air flow in the annular gap.

The first air hole 2, the second air hole 5 and the comb tooth air inlet hole 21 may be circular or may also be triangular or elliptical. In addition, the air holes may be air guiding holes of other shapes, etc., in short, as long as they are capable of guiding the air flow to pass through. Preferably, the above air holes are circular air holes, which can reduce a frictional resistance to flowing of the air flow.

In practical applications, an end portion of the rotor sealing ring 16 can be made to protrude outward properly and can be made to be relatively thin (as shown in FIG. 1), thus ensuring that the spiral comb tooth mechanism can have a sufficient length, to fully exert the effect of guiding flow spirally.

With the stator structure according to this embodiment, the air flow inside the stator can be introduced to the axial end face of the stator iron core 8, and further a spiral air flow can be generated by the first spiral comb tooth mechanism 4 arranged in the annular gap. Since the spiral air flow itself has a certain airtight effect, it can generate a micro-positive pressure environment in the annular gap to resist intrusion of external severe air flow (such as rain or snow, etc.) via the annular gap between the blade side surrounding plate 3 and the rotor sealing ring 16, to make the severe air flow difficult to enter the interior of the generator, thus can prolong the service life of the permanent magnetic pole 18, prevent decline of insulation level of components inside the generator, reduce the risk of the generator corroded by the severe air flow (such as rain or snow, etc.) and guarantee the reliability of insulation.

The components related to the stator according to the embodiments of the present application will be described in detail below.

(1) The Spiral Comb Tooth Mechanism

The first spiral comb tooth mechanism 4 according to this embodiment as a whole is shown in FIG. 2, which is a schematic view of a partial structure of FIG. 1. As can be seen from FIG. 2, the comb tooth air inlet hole 21 can be located at a middle portion of the first spiral comb tooth mechanism 4. The first spiral comb teeth include two parts taking the comb tooth air inlet hole 21 as a center, first spiral comb teeth at a side away from the stator support are referred to as first upper spiral comb teeth 41, while first spiral comb teeth at a side close to the stator support are referred to as first lower spiral comb teeth 42.

Preferably, a spiral direction of the first upper spiral comb teeth 41 is opposite to that of the first lower spiral comb teeth 42, thus can generate two streams of air flow with opposite spiral directions, achieving better flow-splitting and sealing effects.

Further, as can be seen from the cross-sectional view of FIG. 2, the first upper spiral comb teeth 41 are inclined in a direction away from the stator support, and the first lower spiral comb teeth 42 are inclined in a direction close to the stator support. An inclination angle of the spiral comb teeth may change the direction of force acting on the air flow, thereby increasing an advance rate of the airflow with spiral motion towards the inclination direction of the spiral comb teeth, and in combination with the characteristics of the opposite spiraling direction of the upper spiral comb teeth and the lower spiral comb teeth, the spiral comb teeth are enabled to form two streams of air flow with opposite spiral motion directions and traveling in both upper and the lower directions at an increased speed to form opposite double spiral sealing, thus the sealing effect of the spiral comb teeth is improved significantly. In addition, during operation, the wind power generator may also drive the two streams of upper and lower air flows to move in two directions due to the movement of the rotor, which can further enhance the opposite double spiral sealing effect.

Specifically, at a portion of the first spiral comb tooth mechanism 4, the overall movement of the air flow can be divided into a spiral motion substantially along the circumferential direction of the stator and a linear movement substantially along the axis direction of the stator. Referring to FIG. 2, if all of the spiral comb teeth in FIG. 2 are horizontally arranged (the "horizontally" here is only defined relative to the plane shown in FIG. 2), the spiral direction of the air flow may be in a plane that is substantially perpendicular to the paper and is horizontal (i.e., the plane where the comb tooth 23 at the middle portion in FIG. 2 is located). Meanwhile, the air flow may travel in a spiral motion form towards both the upper and lower directions in FIG. 2. If the direction of the spiral comb teeth is not horizontal but has a certain inclination angle, for example, the first upper spiral comb teeth 41 are inclined upward, the spiral motion of the air flow traveling towards the upper side in FIG. 2 may no longer be horizontal, and the inclination angle of the spiral motion is oriented towards a direction away from the stator support. Similarly, the first lower spiral comb teeth 42 generate an air flow having an inclination angle with a spiral motion oriented towards a direction close to the stator support. Such a design may accelerate the air flow in the flowing direction and has a better effect of resisting external severe air flow.

Further, the comb tooth air inlet hole 21 may be further provided with a first middle comb tooth 23, which is arranged on the comb tooth air inlet hole 21, and the first middle comb tooth 23 splits the air flow entering via the comb tooth air inlet hole 21 (as shown in FIGS. 1 and 2), the first middle comb tooth 23 separates the comb tooth air inlet hole 21 into two air flow outlets up and down, i.e., an upper air flow outlet 211 and a lower air flow outlet 212, so that a part of air flow flows towards a direction away from the stator support 1 through the first upper spiral comb teeth 41, and the other part of air flow flows towards a direction close to the stator support 1 through the first lower spiral comb teeth 42.

It is to be noted that, the first middle comb tooth 23 is not a necessary component, and the comb tooth air inlet hole 21 may be arranged to directly face the first upper spiral comb teeth 41 and the first lower spiral comb teeth 42, that is, the first middle comb tooth 23 can be omitted, making a portion of the comb tooth air inlet hole 21 face a starting end of the first upper spiral comb teeth 41 and the other portion face a starting end of the first lower spiral comb teeth 42, thus can separate the air flow as well. Simply, in the case that the first middle comb tooth 23 is provided, the loss of the air flow pressure and the flow rate can be reduced and the two streams of upper and lower spiral air flow can be better separated.

In the above first spiral comb tooth mechanism 4, the air flow from the internal air source may be divided into two streams of air flow taking the comb tooth air inlet hole 21 as the center.

In one aspect, an air flow moving spirally downwards along the whole annular gap can be generated by the first lower spiral comb teeth 42, and this stream of air flow forms a pressure air flow annular barrier after flowing through the first lower spiral comb 42, and actively resist, by means of a combined spiral comb tooth seal (a labyrinth seal, of a spiral structure with an inclination angle, of the first lower spiral comb teeth 42), the gas-liquid-solid multiphase fluid coming from the windward direction and tending to enter the annular gap, in the windward direction, of the wind power generator.

In another aspect, an air flow traveling upward spirally along the entire annular gap can be generated by means of the first upper spiral comb teeth 41. And this stream of air flow, after flowing through the first upper spiral comb teeth 41, is used to assist the pressure seal air flow in establishing a sufficient pressure to form a pressure air flow annular barrier. And further, the air flow enters the gap of the wind power generator (i.e., the air gap between the stator and rotor on right side of FIG. 1) by means of a combined spiral comb tooth seal (a labyrinth seal of the spiral structure with the inclination angle, of the first upper spiral comb teeth 41) to dry the internal surface of the wind power generator, and then gathers at a nacelle side of the end of the stator in the axial direction (i.e., between the tower side tooth pressing plate 10 and the rotor end cover 19), and is finally discharged into the atmospheric environment via an annular gap between the end cover sealing ring 20 and the tower side surrounding plate 11. This stream of upward airflow with spiral motion is used as a drying air flow for convective heat transfer and mass transfer, for removing moisture (moisture discharged from the inside of the wind power generator due to the heat generated by the winding) on the surfaces of the stator, the rotor, and the magnetic pole, thus can prevent the moisture from returning to the wind power generator, thereby preventing the returned moisture from damaging the insulation of the internal insulating material of the wind power generator.

Further, the spiral direction of the first upper spiral comb teeth 41 can be designed to be the same as the rotational direction of the rotor. With such a design, this stream of air flow passing through the upper spiral comb teeth can be more efficiently used. In one aspect, the rotational action of the rotor sealing ring 16 may be used to accelerate the spiral motion of the air flow by means of the friction between the rotor sealing ring 16 and the air flow, to enable the air flow to move upward at an accelerated speed, and reach and pass through the air gap between the stator and the rotor (on the right side of FIG. 1, there is a gap through which the air flow pass as indicated by arrows) at a higher speed, thereby improving the efficiency of drying the generator. In another aspect, when the air flow enters the air gap between the stator and the rotor, the effect of drying the reinforced resin coating of the protection anti-corrosion glass fiber of the rotor permanent magnetic pole and the effect of drying the surface of the stator can be further strengthened, a higher degree of synergy of the humid air concentration field and the dry air flow field within the cavities and the air gaps of the generator can be attained, thereby achieving the object of strengthening the drying.

It is to be further noted that, a pumping pressure head (the end of the spiral comb teeth) generated by the lower "combined spiral comb tooth seal" (i.e., the first upper spiral comb teeth 41) faces downward as shown in FIGS. 1 and 2, and a pumping pressure head generated by the upper combined spiral comb tooth seal faces upward. The spiral directions of the first upper spiral comb teeth 41 and the first lower spiral comb teeth 42 can be arranged to be opposite, i.e., spirals with opposite spiral directions can be formed at both ends taking the first middle comb tooth 23 as a boundary line, so as to generate streams of air flow with opposite spiral motion directions, thereby better facilitating the splitting of the two streams of air flow and enhancing the effect of the labyrinth seal. In addition, the streams of air flowing out via the upper and lower air flow outlets are communicated in their respective circumference area, which is favorable for gathering pressure to form an air flow with a consistent pressure in the circumferential direction.

In view of the above, in the technical solution of the embodiments of the present application, the technical concept of "air pressure sealing" is employed, and the pressure of jet air in the spiral comb teeth is utilized to establish a partial annular space and a micro-positive pressure in the annular gap within the windward air inlet of the open-type generator to block the gap between the rotating part and the stationary part of the generator, thus preventing the air flow carrying rain or snow from the windward direction from entering this gap to ensure the seal. The pressure generated by the air source at this sealed portion is higher than the natural environment pressure outside the generator. Thus, a sealing manner for the open-type wind power generator is built up and a specific structure of the air flow passage is constructed.

In view of the above, the above sealing mechanism includes a static seal and a dynamic seal in the aspect of sealing states, and includes a combination of three kinds of sealing principles, i.e., comb tooth sealing, spiral sealing and air pressure sealing in the aspect of sealing mechanism, so that the multiphase air flow can be sufficiently shielded outside the annular air gap.

In addition, the windward air flow carrying the rain (or snow), after hitting the wind power generator and being blocked, passes through the stator surrounding plate and the rotor sealing ring 16 (surrounding plate), and then reaches the annular gap between the blade side surrounding plate 3 and the rotor sealing ring 16. Gas-liquid two-phase flow of rain and water or gas-solid two-phase flow of wind and snow forms a pressure in the windward annular gap of the generator. Using the basic principle of the equilibrium state of hydrodynamics, the pressure and flow rate required by the outlet air flow of the spiral comb tooth mechanism as an air pressure sealing element in the annular gap can be calculated. An open-loop spiral confluence cavity is configured at the air flow passage outlet within an expansion cavity of the labyrinth seal to uniform the pressure and conflux the flow as the main pipe 13. The combined pressure seal of the spiral comb tooth generates a high-speed air flow by virtue of a sufficient pressure supplied by the air source, and have controllable flow rate and flow volume at the outlet so as to be adapted to the changes in velocity of the windward air flow. That is, the pressure of the air pressure sealing can be automatically adjusted as desired to achieve a self-adaptive adjustment, to achieve the object of a small power consumption of the air source.

In addition, the air guide pipe connected between the comb tooth air inlet hole 21 and the second air hole 5 may have the following two forms.

1) The air guide pipe 22 as a whole is annular, that is, similar to the shape of the first spiral comb tooth mechanism 4. And the air guide pipe 22 extends along the circumference of the blade side tooth pressing plate 6 into an annular shape of 360 degrees. Such a structure allows the air flow flowing out of multiple second air holes 5 to be uniformly mixed in the circumferential direction and then fed into the comb tooth air inlet hole 21, to allow the pressure of the air flow entering the comb tooth air inlet hole 21 to be uniform in the circumferential direction.

2) The comb tooth air inlet holes 21 and the respective second air holes 5 are connected via multiple air guide pipes 22 separated from each other. In such an arrangement, it is not necessary to manufacture the annular air guide pipe 22, thus the manufacturing of component is relatively simple. The number of the air guide pipes 22 can be set according to the number of the second air holes 5, for example, in the following description, the number of the air flow passages is 48, and accordingly, the number of the air guide pipes 22 may be set to be 48.

(2) Air Flow Passage Inside the Stator Iron Core

Figure 3:
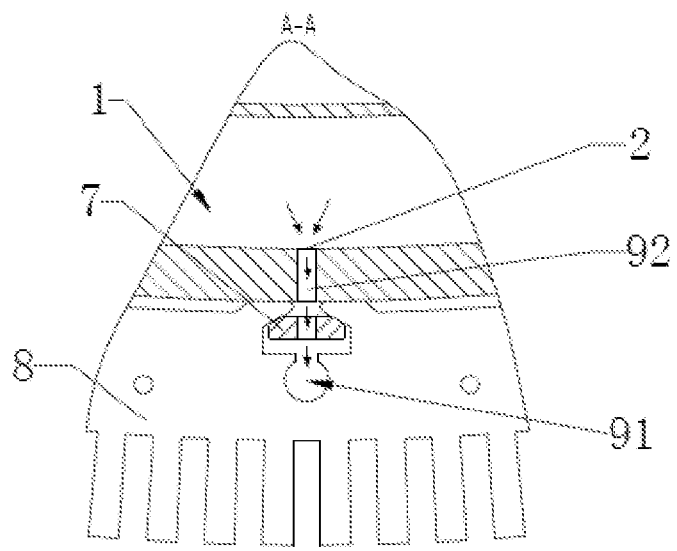
FIG. 3 is a schematic sectional view taken along line A-A in FIG. 1.

The air flow passage 9 inside the stator iron core 8 is configured to introduce air source supplied by an air source system 12 inside the stator into the at least one second air hole 5 provided in the blade side tooth pressing plate 6. Specifically, reference is made to FIG. 3, which is a schematic sectional view taken along line A-A in FIG. 1. A stamped sheet fixing key 7 is fixed to the outer peripheral wall of the stator support 1, and the stator iron core 8 (the stator iron core 8 is formed by combining multiple iron core modules, and each iron core module is formed by stacking iron core sheets) has a dovetail groove, which is sleeved on the stamped sheet fixing key 7, thereby fixing the stator iron core 8 to the outer peripheral wall of the stator support 1. The first air hole 2 may be located in a portion in contact with the stamped sheet fixing key 7 of the outer peripheral wall of the stator support 1, and the air flow passage 9 may extend through an air hole of the stamped sheet fixing key 7 to be in communication with the first air hole 2.

As shown in FIG. 1, the air flow passage 9 may include a radial air flow passage 92 and an axial air flow passage 91. The radial air flow passage 92 may extend through the stamped sheet fixing key 7 and the interior of the stator iron core 8. The radial air flow passage 92 has one end connected to the first air hole 2 and another end connected to the axial air flow passage 91. The axial air flow passage 91 may axially extend through the interior of the stator iron core 8 to be in communication with the second air hole 5. The radial air flow passage 92 and the axial air flow passage 91 may be directly connected or may be bent as desired and then connected, as long as the radial air flow passage 92 and the axial air flow passage 91 are connected to each other.

Figure 4:
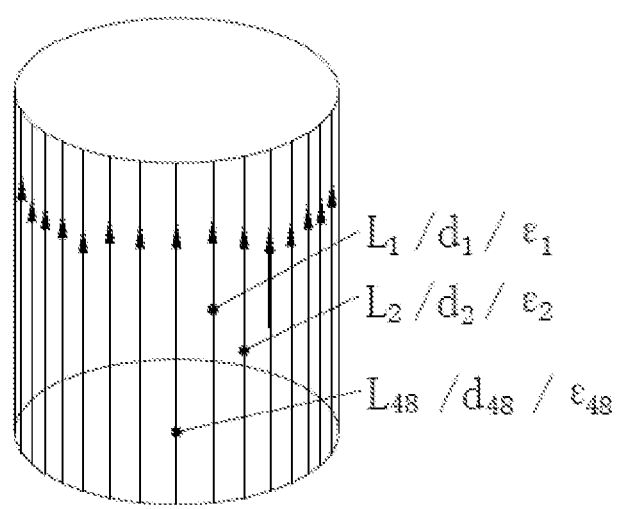
FIG. 4 is a schematic view of air flow paths inside a stator iron core of the permanent magnet direct-drive wind power generator according to the first embodiment of the present application.

Furthermore, the first air hole 2, the second air hole 5, and the air flow passage 9 may be plural and equal in number, and are uniformly arranged along the circumference. Multiple first air holes 2, second air holes 5 and air flow passages 9 are in communication with each other respectively to form multiple independent air flow paths from the inner wall of the stator support 1 to the blade side tooth pressing plate 6. Preferably, under the blade side pressing plate 6 inside the stator iron core 8, the radial air flow passage 92 is turned by 90 degrees inside the stator iron core 8 to enter the axial air flow passage 91 which is in parallel with the axial direction of the generator stator. As shown in FIG. 4, which is a schematic view of airflow paths inside a stator iron core of the permanent magnet direct-drive wind power generator according to an embodiment of the present application, the radial air flow passages correspond to the axial air flow passages respectively, only the axial air flow passages are illustrated. A plurality of air flow passages are provided according to an embodiment of the present application. Preferably, as shown in FIG. 4 which is a schematic view of air flow paths inside a stator iron core of the permanent magnet direct-drive wind power generator according to the first embodiment of the present application, a total of 48 air flow passages are provided, and each of lengths ($L_1, L_2 \ldots L_{48}$), inner diameters ($d_1, d_2 \ldots d_{48}$) and absolute roughness ($\varepsilon_1, \varepsilon_2 \ldots \varepsilon_{48}$), of the 48 air flow passages are preferably the same and circumferential intervals are also uniform.

(3) Air Source System within the Wind Power Generator Unit

The air source of the air source system 12 within the wind power generator system 12 (specifically, the air source system 12 may be provided inside the stator support or in the space of a nacelle) may be derived from an air pressure generation device in the nacelle. The air source system 12 can resist the intrusion of gas-liquid two-phase flow of the wind and rain and gas-solid two-phase flow of the snow and air in the rainy and snowy weather time. The air source system 12 operates in a time period when the interior of the generator is required to be dried, such that the stator insulation and a protective layer of the rotor magnetic pole of the power generator are sufficiently dried and at the same time energy consumption of the air source is reduced. The air flow passage 9 provided in the stator is connected to the air source system 12 via the first air hole 2, to introduce the air source inside the wind power generator unit into the air flow passage 9. The air source system 12 may include an air source generation device for generating an air flow with a predetermined pressure and an air source treatment device capable of purifying and drying the air flow.

The air source generation device may be an air compressor. The air compressor (or compressor) is an air pressure generation device, and is a machine configured to increase the pressure of air or convey the air, and is a converting device for converting the mechanical energy supplied by a prime mover into air pressure energy. During the operation of the air compressor, the air in a compressor cylinder is rapidly compressed, and the process of rapid compression of the gas is an exothermic process that may inevitably cause the temperature in the compressor cylinder to rise. Therefore, it is generally necessary to cool the air. In an air compressor with multi-stage compression, exhaust gas at the last stage may have a temperature up to 140-170 Celsius degrees, and under such a high temperature, a certain amount of gaseous oil and water vapor are generally mixed in the compressed air, and a cooler is required to be provided to cool the compressed air, to primarily separate the oil and moisture contained in the compressed air to prevent the oil and moisture from entering the flow passage of the stator iron core of the wind power generator along with the compressed air. Therefore, the air source treatment device may also include an air filter, a cooler, an oil-water separator and a dryer. The air filter is used to filter the air before it entering the air compressor cylinder (i.e., to filter the dust and other impurities contained in the air inside the nacelle) to prevent friction and abrasion between relative moving parts in the air compressor cylinder caused after the dust, solid contaminants and the like in the air entering the air compressor.

In addition, the oil-water separator (gas-liquid separator) is configured to further separate the oil and moisture contained in the compressed air to allow the compressed air to be preliminarily purified to eliminate pollution and corrosion of the oil and moisture to the flow passage inside the iron core of the stator support of the generator as well as the interior of the generator.

In addition, the compressed air, after passing through the cooler and oil-water separator, still contains a certain amount of moisture, and a content of which depends on the temperature, pressure and relative humidity of the air. What is needed in the generator is dry air, therefore, an air drying device, i.e., a dryer, is required to be arranged.

Figure 5:
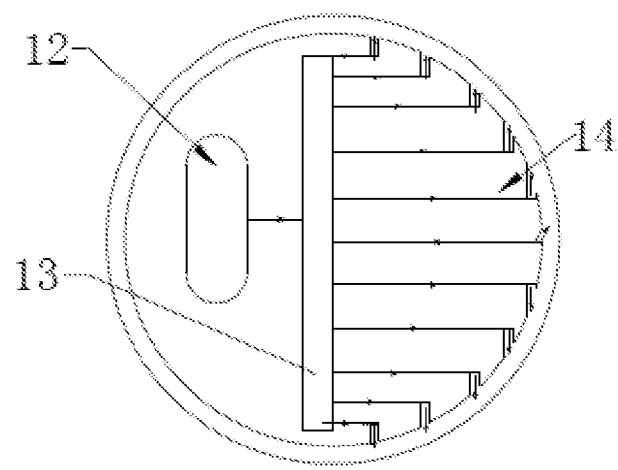
FIG. 5 shows an air flow acquisition path inside the stator of the permanent magnet direct-drive wind power generator according to the first embodiment of the present application.

Further, as shown in FIG. 5, which shows an air flow acquiring path inside the stator of the permanent magnet direct-drive wind generator according to the first embodiment of the present application, the air source system 12 may be connected to the first air hole 2 via a main pipe 13 and branch pipes 14. The branch pipes 14, with the same number as the first air holes 2, can be led out from the main pipe 13, and the branch pipes 14 are connected to the first air holes 2 respectively. The main pipe 13 is preferably ringshaped or may be segmented ring segments, thereby reducing the frictional resistance caused to the flowing of the air flow.

In addition, there may be two heat sources for drying, one of which is a dryer provided in the above air source system 12 and the other is a stator coil. The stator coil as the drying heat source can be applied in a shutdown state, it requires to feedback power to the generator stator through power grid via an invert unit of a converter, so that the stator generates heat to dry the internal structure and internal materials of the stator. In the case that two heat sources are used in combination, the moisture inside the stator is discharged to the stator surface through the heat generated by the stator itself, and then removed from the stator surface by the dry air from the inner air source system 12, so as to remove the moistures inside and outside the stator at the same time.

(4) Flow Path of Air Flow

The air flow in a nacelle is conveyed to the first air hole 2 in the stator support 1 after being filtered, dried and compressed by the air source system 12, and the air flow passes through the stamped sheet fixing key 7 from the first air hole 2 to enter a radial air flow passage 92 of the stator iron core 8, and the air flow is turned into the axial air flow passage 91 along the radial air flow passage 92, and then passes through the second air hole 5 of the blade side tooth pressing plate 6 via the axial air flow passage 91. Afterwards, the air flow is introduced to the comb tooth air inlet hole 21 of the blade side surrounding plate 3 through the air guide pipe 22, and the air flow sprayed out of the comb tooth air inlet hole 21 then enters the above first spiral comb tooth mechanism 4 to generate two streams of spiral air flow, i. e., an upper spiral air flow and a lower spiral air flow, and the air flow moving spirally downwards blocks the annular rotation gap and prevents the intrusion of the gas-solid two-phase flow of rain and snow or the gas-liquid two-phase flow of rain and water. The air flow spirally moving upwards may impact the rotor sealing ring 16, and rebounded air flow after impacting enters the air gap between the stator and the rotor and axially gathers in a nacelle side (i.e., between the tower side tooth pressing plate 10 and the rotor end cover 19) at the stator end, and finally is discharged into the atmospheric environment via the annular gap between the end cover sealing ring 20 and the tower side surrounding plate 11, and the part of air flow rebounded inside the generator may also dry the winding 17 and the magnetic pole 18.

Second Embodiment

Figure 6:
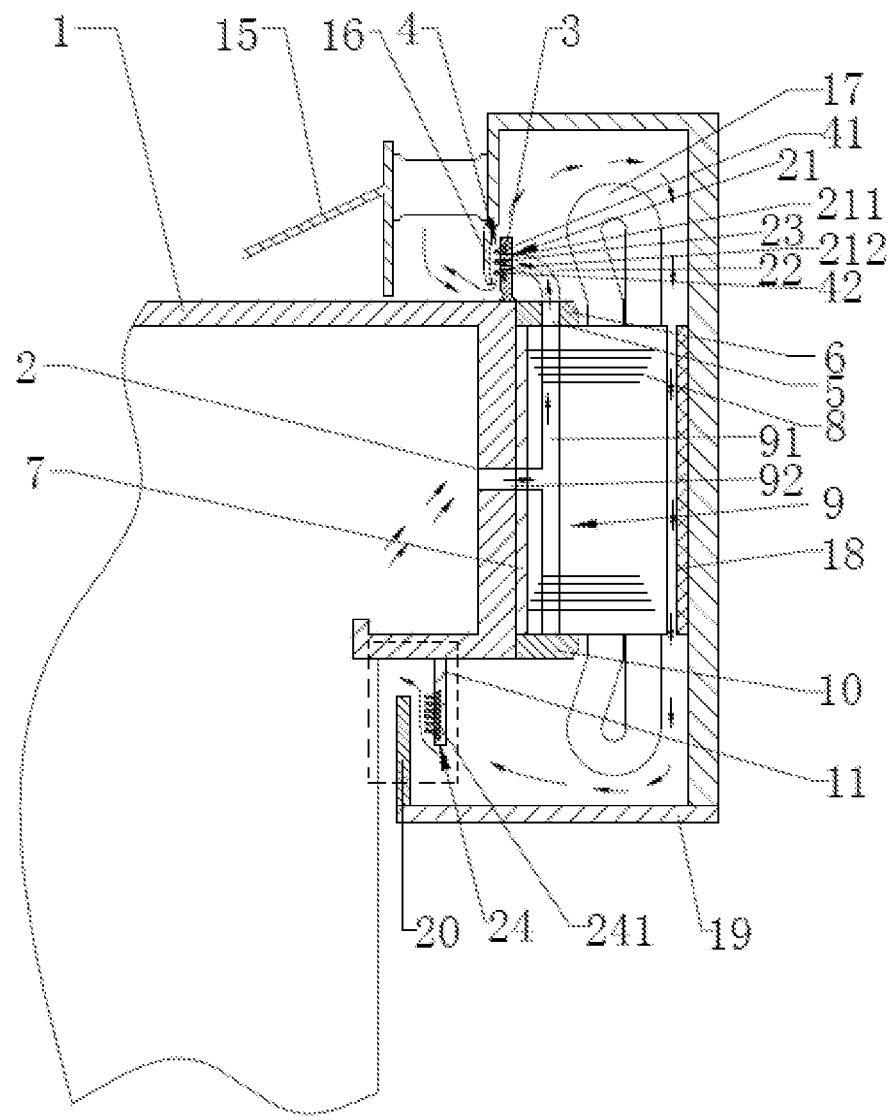
FIG. 6 is a schematic view showing the structure of a stator of a permanent magnet direct-drive wind power generator according to a second embodiment of the present application.
Figure 7:
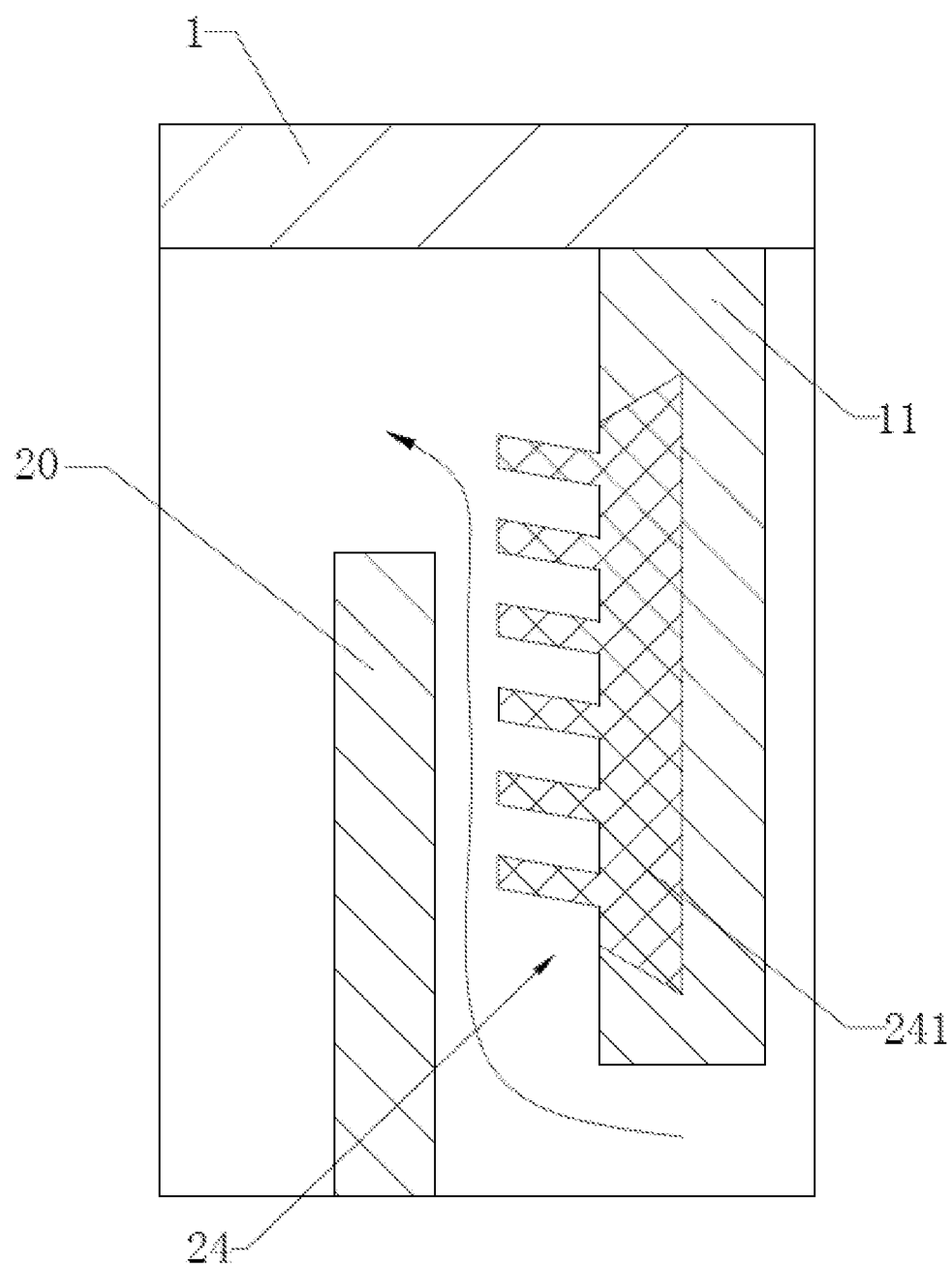
FIG. 7 is a partial schematic structural view of FIG. 6.

On the basis of the first embodiment, the stator according to this embodiment is also provided with a spiral comb tooth mechanism on the tower side surrounding plate at the tower side. Specifically, as shown in FIGS. 6 and 7, FIG. 6 is a schematic view showing the structure of a stator of a permanent magnet direct-drive wind power generator according to the second embodiment of the present application, and FIG. 7 is a partial schematic structural view of FIG. 6. In the tower side direction, the stator further includes a tower side tooth pressing plate 10 and a tower side surrounding plate 11, and the tower side tooth pressing plate 10 is arranged on an axial end face at the tower side of the stator iron core 8, and accordingly, the rotor frame 15 includes an end cover sealing ring 20, and an annular gap is formed between the end cover sealing ring 20 and the tower side surrounding plate 11.

A second spiral comb tooth mechanism 24 is further provided on a side, close to the rotor sealing ring 16, of the blade side surrounding plate 3, and the second spiral comb tooth mechanism 24 as a whole is annular and has second spiral comb teeth 241, which protrude into the annular gap formed by the blade side surrounding plate 3 and the rotor sealing ring 16 to generate an airflow with spiral motion in the annular gap, so that a pressure air flow annular barrier is established in the annular gap between the end cover sealing ring 20 and the tower side surrounding plate 11 to resist intrusion of external severe air flow into the wind power generator.

As described in the first embodiment, the air flow passing through the first upper spiral comb teeth 41 may enter the air gap of the generator (i.e., an air gap between the stator and rotor on the right side of FIG. 1) to dry an internal surface of the generator, and then is axially gathered on the nacelle side at an end of the stator (i.e., between the tower side tooth pressing plate 10 and the rotor end cover 19), and finally is discharged into the atmospheric environment via the annular gap between the end cover sealing ring 20 and the tower side surrounding plate 11. The second spiral comb tooth mechanism 24 in this embodiment just acts on this stream of air flow, and when this stream of air flow gathers in the nacelle side at the stator, this stream of air flow may be discharged outwards through the second spiral comb tooth mechanism 24. The second spiral comb tooth mechanism 24 generates the air flow with spiral motion by this stream of air flow from the blade side to establish a pressure seal environment in the annular gap at the tower side.

Figure 8:
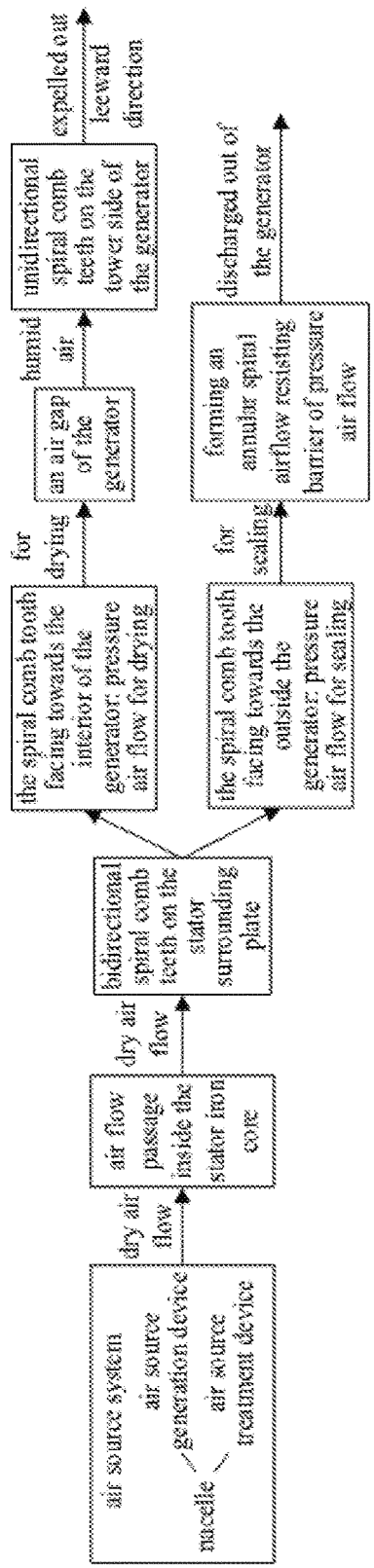
FIG. 8 is a schematic view showing an overall air flow path of the permanent magnet direct-drive wind power generator according to an embodiment of the present application.

Further, in order to better prevent intrusion of external severe airflow into the wind power generator, preferably, in the sectional view of the second spiral comb teeth, the second spiral comb teeth 241 are inclined in a direction close to the stator support 1, so as to generate an air flow with an inclination angle of spiral motion being towards a direction close to the stator support, thereby advantageously resisting intrusion of external air flow. The structures in the two embodiments are described above, and the overall air flow path in practical application is described below, as shown in FIG. 8, which is a schematic view showing an overall air flow path of the permanent magnet direct-drive wind power generator according to an embodiment of the present application. A dry air flow is generated by the air source system 12 arranged in the nacelle, and passes through the air flow passage inside the stator iron core 8 to reach the first spiral comb tooth mechanism 4 with bidirectional spiral comb teeth on the stator surrounding plate, at which the dry air flow is divided into two parts. One part of the dry air flow flows toward the outside of the generator to form an annular spiral flow barrier of pressure air flow for blocking the external severe air flow. And the other part of the dry air flow flows upward towards the interior of the generator to flow through the air gaps of the generator, carrying moisture from the surface of generator (including the moisture exuded from the interior of the generator) to generate humid air, and then is expelled out of the second spiral comb tooth mechanism 24 having unidirectional spiral comb teeth on the tower side of the generator.

Third Embodiment

This embodiment relates to a permanent magnet direct-drive wind power generator, which includes a rotor and the stator according to the above first embodiment or the second embodiment.

In addition, a permanent magnet direct-drive wind power generator system is further provided according to this embodiment, which includes the above wind power generator and an air source system 12 arranged inside the wind power generator unit, and the air source system 12 may be connected to the first air hole 2. As an optional embodiment, the air source system 12 and the components associated with the air source system 12 have also been described in the previous first embodiment and are not described here again.

The embodiments described hereinabove are only specific embodiments of the present application, and the scope of the present application is not limited thereto. Any variations or substitutions easily conceived by those skilled in the art within the technical scope disclosed in the present application should be covered in the scope of the present application. Therefore, the scope of the present application should be defined by the scope of the claims.

The invention claimed is:

1. A stator of a permanent magnet direct-drive wind power generator, comprising:
    a stator support,
    a stator iron core arranged around an outer peripheral wall of the stator support,
    a blade side tooth pressing plate, and
    a blade side surrounding plate;
    wherein the blade side tooth pressing plate is arranged on an axial end face at a blade side of the stator iron core, and a rotor matching with the stator has a rotor sealing ring;
    at least one first air hole is provided in the outer peripheral wall of the stator support, and at least one second air hole is provided in the blade side tooth pressing plate;
    the stator further comprises at least one air flow passage via which the first air hole and the second air hole are in communication with each other, and the at least one air flow passage extends through an interior of the stator iron core;
    at least one comb tooth air inlet hole is provided on a side, close to the rotor, of the blade side surrounding plate, the comb tooth air inlet hole and the second air hole are connected via an air guide pipe; and
    a first spiral comb tooth mechanism is provided on a side, close to the rotor sealing ring, of the blade side surrounding plate, the first spiral comb tooth mechanism as a whole is annular and is in communication with the at least one comb tooth air inlet hole, the first spiral comb tooth mechanism has first spiral comb teeth, the first spiral comb teeth protrude into an annular gap formed by the blade side surrounding plate and the rotor sealing ring for generating an airflow with spiral motion in the annular gap.

2. The stator of the permanent magnet direct-drive wind power generator according to claim 1, wherein in an axial direction of the stator, the comb tooth air inlet hole is located in the middle of the first spiral comb tooth mechanism, the first spiral comb tooth mechanism comprises first upper spiral comb teeth and first lower spiral comb teeth;
    taking the comb tooth air inlet hole as a center, first spiral comb teeth at a side away from the stator support are the first upper spiral comb teeth and first spiral comb teeth at a side close to the stator support are the first lower spiral comb teeth; and
    in a sectional view of the first spiral comb teeth, the first upper spiral comb teeth are inclined in a direction away from the stator support to generate an air flow with an inclination angle of spiral motion being inclined towards a direction away from the stator support, and the first lower spiral comb teeth are inclined in a direction close to the stator support to generate an air flow with an inclination angle of spiral motion being inclined towards a direction close to the stator support.

3. The stator of the permanent magnet direct-drive wind power generator according to claim 2, wherein a spiral direction of the first upper spiral comb teeth is opposite to a spiral direction of the first lower spiral comb teeth.

4. The stator of the permanent magnet direct-drive wind power generator according to claim 3, wherein the spiral direction of the first upper spiral comb teeth is the same as a rotational direction of the rotor.

5. The stator of the permanent magnet direct-drive wind power generator according to claim 2, wherein the first spiral comb teeth further comprise a first middle comb tooth; and
    the first middle comb tooth is provided in the comb tooth air inlet hole, the first middle comb tooth splits an air flow flowing from the comb tooth air inlet hole, to allow a part of the air flow to flow into the first upper spiral comb teeth, and the other part of the air flow to flow into the first lower spiral comb teeth.

6. The stator of the permanent magnet direct-drive wind power generator according to claim 1, wherein the stator further comprises a tower side tooth pressing plate and a tower side surrounding plate, the tower side tooth pressing plate is arranged on an axial end face at the tower side, of the stator iron core, and the rotor further comprises an end cover sealing ring; and
    a second spiral comb tooth mechanism is provided on a side, close to the end cover sealing ring, of the tower side surrounding plate, the second spiral comb tooth mechanism as a whole is annular and has second spiral comb teeth, and the second spiral comb teeth protrude into an annular gap formed by the tower side surrounding plate and the end cover sealing ring, for generating an airflow with spiral motion in the annular gap.

7. The stator of the permanent magnet direct-drive wind power generator according to claim 6, wherein in a sectional view of the second spiral comb teeth, the second spiral comb teeth are inclined in a direction close to the stator support to generate an air flow with an inclination angle of spiral motion being inclined towards a direction close to the stator support.

8. The stator of the permanent magnet direct-drive wind power generator according to claim 1, wherein the at least one comb tooth air inlet hole and the at least one second air hole are connected respectively via an air guide pipe which as a whole is annular, or the at least one comb tooth air inlet hole and the at least one second air hole are connected respectively via a plurality of air guide pipes separated from each other.

9. The stator of the permanent magnet direct-drive wind power generator according to claim 1, wherein a stamped sheet fixing key is fixed on the outer peripheral wall of the stator support, a dovetail groove of the stator iron core is arranged on the stamped sheet fixing key, and the at least one air flow passage extends through the stamped sheet fixing key to be in communication with the at least one first air hole.

10. The stator of the permanent magnet direct-drive wind power generator according to claim 9, wherein the air flow passage comprises a radial air flow passage and an axial air flow passage, the radial air flow passage extends through the stamped sheet fixing key and the interior of the stator iron core, the radial air flow passage has one end connected to the first air hole and another end connected to the axial air flow passage, and the axial air flow passage extends axially through the interior of the stator iron core to be in communication with the second air hole.

11. The stator of the permanent magnet direct-drive wind power generator according to claim 10, wherein a plurality of the first air holes, a plurality of the second air holes and a plurality of the air flow passages are provided and have the same number; and the plurality of first air holes, the plurality of second air holes, and the plurality of air flow passages are arranged circumferentially uniformly, and are communicated respectively, to generate a plurality of independent air flow paths from the outer peripheral wall of the stator support to the blade side tooth pressing plate.

12. A permanent magnet direct-drive wind power generator, comprising a rotor and the stator according to claim 1.

13. A permanent magnet direct-drive wind power generator system, comprising the permanent magnet direct-drive wind power generator according to claim 12 and an air source system arranged inside a wind power generator unit, wherein the air source system is connected to the first air hole.

14. The permanent magnet direct-drive wind power generator system according to claim 13, wherein the air source system comprises an air source generation device configured to generate an air flow with a predetermined pressure, and an air source treatment device configured to purify and dry the air flow.

15. The permanent magnet direct-drive wind power generator system according to claim 14, wherein the air source generation device is an air compressor, and the air source treatment device comprises an air filter, a cooler, an oil-water separator and a dryer.

16. The permanent magnet direct-drive wind power generator system according to claim 15, wherein the air source system is connected to the first air hole via a main pipe and branch pipes, the branch pipes, with the same number as the first air hole, are introduced from the main pipe, and are connected to the first air holes respectively.

17. A permanent magnet direct-drive wind power generator, comprising a rotor and the stator according to claim 2.

18. A permanent magnet direct-drive wind power generator, comprising a rotor and the stator according to claim 6.

19. A permanent magnet direct-drive wind power generator, comprising a rotor and the stator according to claim 8.

20. A permanent magnet direct-drive wind power generator, comprising a rotor and the stator according to claim 9.

* * * * *